(12) United States Patent
Harmon

(10) Patent No.: US 10,365,913 B2
(45) Date of Patent: Jul. 30, 2019

(54) SYSTEMS AND METHODS FOR UPDATING NETWORK DEVICES

(71) Applicant: Symantec Corporation, Mountain View, CA (US)

(72) Inventor: Justin Harmon, Knoxville, TN (US)

(73) Assignee: Symantec Corporation, Mountain View, CA (US)

(*) Notice: Subject to any disclaimer, the term of this patent is extended or adjusted under 35 U.S.C. 154(b) by 2 days.

(21) Appl. No.: 15/152,822

(22) Filed: May 12, 2016

(65) Prior Publication Data

US 2017/0329597 A1    Nov. 16, 2017

(51) Int. Cl.
 G06F 9/44     (2018.01)
 G06F 8/65     (2018.01)

(52) U.S. Cl.
 CPC ..................... *G06F 8/65* (2013.01)

(58) Field of Classification Search
 CPC ........................................ G06F 8/65
 USPC ....................................... 717/171
 See application file for complete search history.

(56) References Cited

U.S. PATENT DOCUMENTS

| 8,677,343 B2* | 3/2014 | Averbuch | G06F 8/665 717/171 |
| 2008/0154805 A1* | 6/2008 | Gurumoorthy | G06F 9/505 706/12 |
| 2012/0130725 A1* | 5/2012 | Cooper | G06Q 10/10 705/1.1 |
| 2013/0074061 A1* | 3/2013 | Averbuch | G06F 8/665 717/171 |
| 2015/0373561 A1* | 12/2015 | Huang | H04W 24/02 370/252 |

OTHER PUBLICATIONS

Ilya Sokolov, et al; Sytems and Methods for Performing Authentication at a Network Device; U.S. Appl. No. 14/489,987, filed Mar. 15, 2015.
Auto-Away is now part of Home/Away Assist; Nest Support; https://nest.com/support/article/What-is-Auto-Away, as accessed Mar. 22, 2016; (on or before Mar. 22, 2016).
Internet of things; Wikipedia; https://en.wikipedia.org/wiki/Internet_of_things, as accessed Mar. 22, 2016; (on or before Mar. 22, 2016).

* cited by examiner

Primary Examiner — Wei Y Zhen
Assistant Examiner — Lanny Ung
(74) Attorney, Agent, or Firm — FisherBroyles, LLP

(57) ABSTRACT

The disclosed computer-implemented method for updating network devices may include (1) determining, by monitoring at least one endpoint device connected to a network device that provides a network connection for the endpoint device, periodic time intervals in which a user of the endpoint device is unlikely to access the network connection via the network device, (2) detecting that a system update is available for the network device that will impair the ability of the network device to provide the network connection for the endpoint device while being applied to the network device, (3) identifying, based on the periodic time intervals in which the user is unlikely to access the network connection, an optimal time at which to apply the available system update to the network device, then (4) applying the available system update to the network device at the optimal time.

18 Claims, 6 Drawing Sheets

SYSTEMS AND METHODS FOR UPDATING NETWORK DEVICES

BACKGROUND

Developers and manufacturers of computing devices may periodically distribute system updates that increase the performance and/or security of their products. However, while a system update may benefit a computing device, the process of installing or applying an update to a computing device may interfere with the functionality of the device. For example, a network device may be unable to provide network services for endpoint devices while the network device undergoes a system update.

Some conventional systems for updating network devices may ensure that network devices receive important system updates by automatically installing the updates onto the network devices. Unfortunately, such automatic update systems may disrupt or interfere with a user's attempts to access a network connection. To solve this problem, other traditional systems for updating network devices may allow users to manually select when to apply updates to their network devices. However, users may decide to indefinitely postpone and/or ignore critical system updates for their network devices. As such, the network devices may be left vulnerable to security threats and/or suffer from software bugs or other performance deficiencies. The current disclosure, therefore, identifies and addresses a need for improved systems and methods for updating network devices.

SUMMARY

As will be described in greater detail below, the instant disclosure describes various systems and methods for updating network devices by identifying an optimal time to apply a system update to a network device based on a prediction of when a user of the network device is unlikely to access a network connection provided by the network device.

In one example, a computer-implemented method for performing such a task may include (1) determining, by monitoring at least one endpoint device connected to a network device that provides a network connection for the endpoint device, periodic time intervals in which a user of the endpoint device is unlikely to access the network connection via the network device, (2) detecting that a system update is available for the network device that will impair the ability of the network device to provide the network connection for the endpoint device while being applied to the network device, (3) identifying, based on the periodic time intervals in which the user is unlikely to access the network connection, an optimal time at which to apply the available system update to the network device, and then (4) applying the available system update to the network device at the optimal time. In one embodiment, the method may further include confirming that the user is not currently accessing the network connection before applying the available system update to the network device at the optimal time.

In some examples, the endpoint device may provide a service for the user based in part on gathering information about periods of activity of the user. In these examples, monitoring the endpoint device may include accessing the information gathered by the endpoint device. Additionally or alternatively, monitoring the endpoint device may include intercepting network traffic distributed between the endpoint device and the network device and then recording times at which the network traffic was distributed.

In some embodiments, determining the periodic time intervals in which the user is unlikely to access the network connection may include determining periodic time intervals in which the user is likely to be outside of a range of the network connection. Additionally or alternatively, determining the periodic time intervals may include determining periodic time intervals in which the user is likely to be within a range of the network connection but not attempting to access the network connection.

In some examples, identifying the optimal time at which to apply the available system update may include identifying a time that the next-closest time interval in which the user is unlikely to access the network connection begins. In these examples, identifying the optimal time may further include determining whether a duration of the next-closest time interval is sufficient for the available system update to be applied to the network device. Additionally or alternatively, identifying the optimal time may further include determining to apply the available system update to the network device before the next-closest time interval begins based on determining that a level of importance of the available system update exceeds a predetermined importance threshold and/or that an amount of time until the next-closest time interval begins is greater than a predetermined amount of time.

In one embodiment, a system for implementing the above-described method may include (1) a determination module that determines, by monitoring at least one endpoint device connected to a network device that provides a network connection for the endpoint device, periodic time intervals in which a user of the endpoint device is unlikely to access the network connection via the network device, (2) a detection module that detects that a system update is available for the network device that will impair the ability of the network device to provide the network connection for the endpoint device while being applied to the network device, (3) an identification module that identifies, based on the periodic time intervals in which the user is unlikely to access the network connection, an optimal time at which to apply the available system update to the network device, and (4) an update module that applies the available system update to the network device at the optimal time. In addition, the system may include at least one hardware processor configured to execute the determination module, the detection module, the identification module, and the update module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine, by monitoring at least one endpoint device connected to a network device that provides a network connection for the endpoint device, periodic time intervals in which a user of the endpoint device is unlikely to access the network connection via the network device, (2) detect that a system update is available for the network device that will impair the ability of the network device to provide the network connection for the endpoint device while being applied to the network device, (3) identify, based on the periodic time intervals in which the user is unlikely to access the network connection, an optimal time at which to apply the available system update to the network device, and then (4) apply the available system update to the network device at the optimal time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
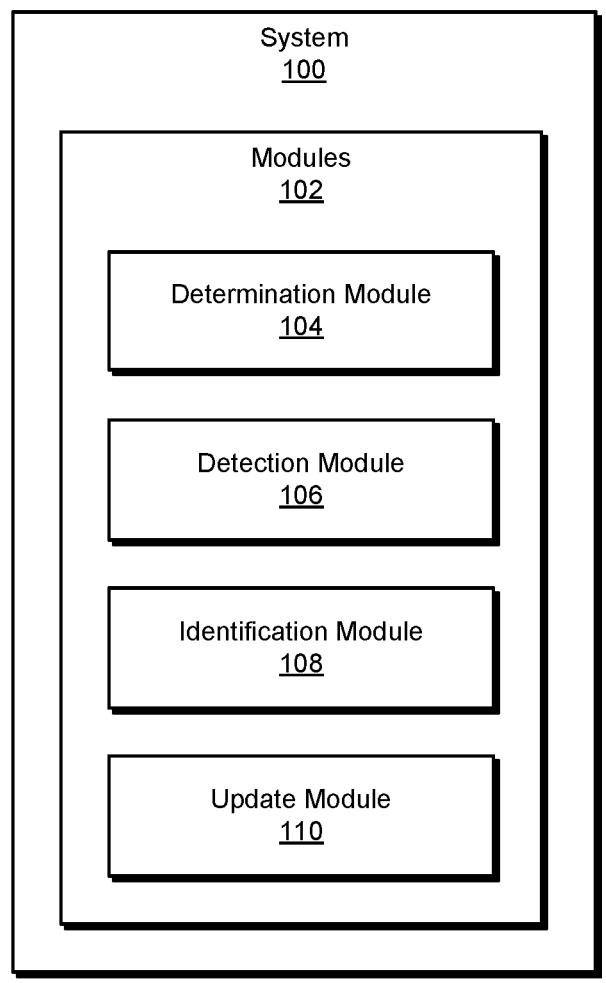
FIG. 1 is a block diagram of an exemplary system for updating network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating network devices. As will be explained in greater detail below, by monitoring interactions between a user and one or more endpoint devices connected to a network, the systems and methods described herein may predict future periods of time in which the user is unlikely to attempt to access the network. As such, when a system update is available for a network device that provides the network, the disclosed systems and methods may apply the system update to the network device at a time that will not interfere with attempts by the user to access the network.

Figure 2:
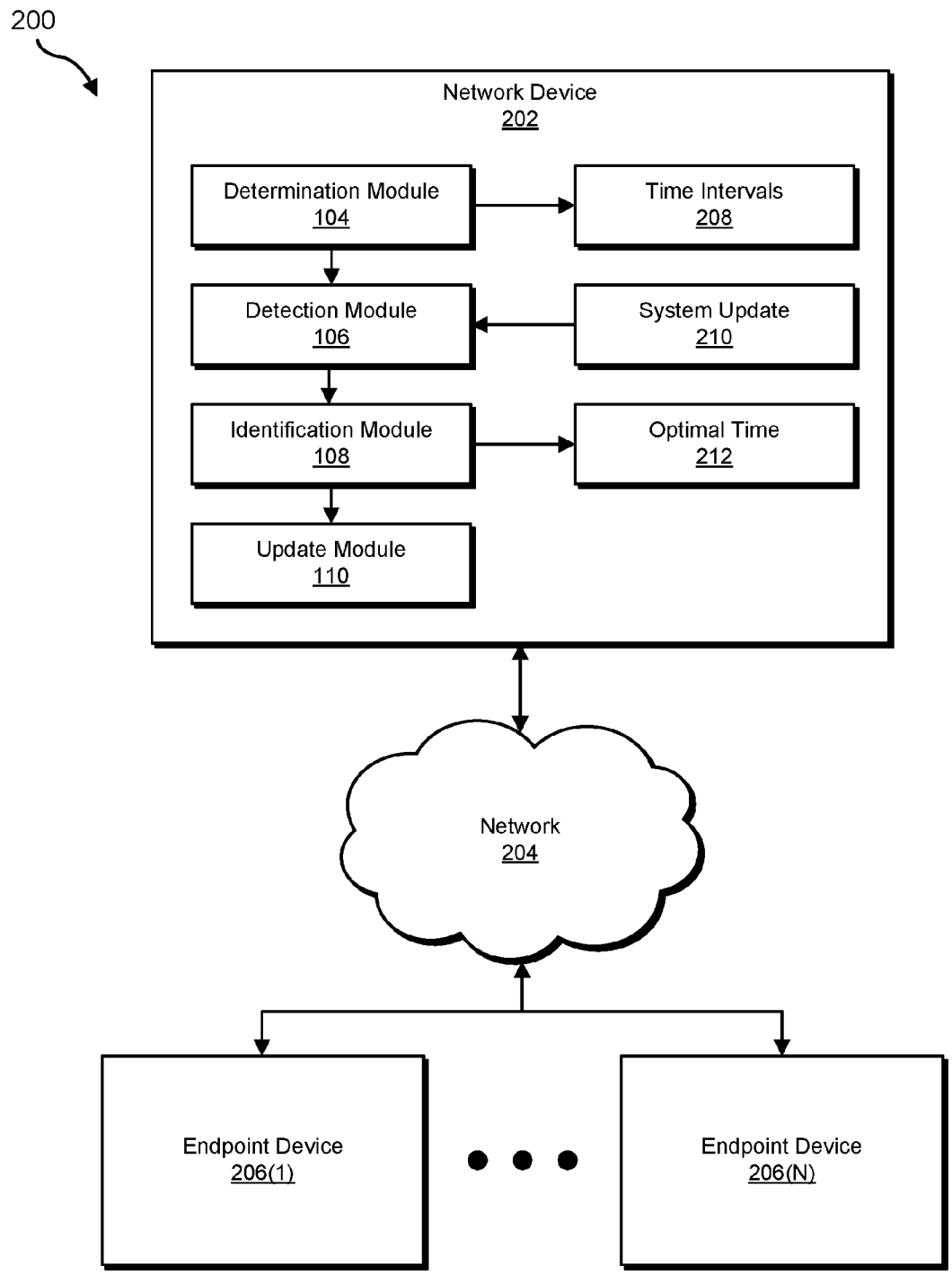
FIG. 2 is a block diagram of an additional exemplary system for updating network devices.

The following will provide, with reference to FIGS. 1 and 2, detailed descriptions of exemplary systems for updating network devices. Detailed descriptions of corresponding computer-implemented methods will also be provided in connection with FIG. 3. In addition, detailed descriptions of periodic time intervals in which users are unlikely to access network connections will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for updating network devices. As illustrated in this figure, exemplary system 100 may include one or more modules 102 for performing one or more tasks. For example, and as will be explained in greater detail below, exemplary system 100 may include a determination module 104 that determines, by monitoring at least one endpoint device connected to a network device that provides a network connection for the endpoint device, periodic time intervals in which a user of the endpoint device is unlikely to access the network connection via the network device. Exemplary system 100 may also include a detection module 106 that detects that a system update is available for the network device that will impair the ability of the network device to provide the network connection for the endpoint device while being applied to the network device.

In addition, and as will be described in greater detail below, exemplary system 100 may include an identification module 108 that identifies, based on the periodic time intervals in which the user is unlikely to access the network connection, an optimal time at which to apply the available system update to the network device. Finally, exemplary system 100 may include an update module 110 that applies the available system update to the network device at the optimal time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., network device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with one or more of endpoint devices 206(1)-(N) via a network 204. In one example, network device 202 may be programmed with one or more of modules 102. In this example, modules 102 may operate as part of an update service on network device 202. Additionally or alternatively, all or a portion of endpoint devices 206(1)-(N) may be programmed with one or more of modules 102. In these examples, the modules hosted on endpoint devices 206(1)-(N) may aid the update service on network device 202 in monitoring and recording activity on endpoint devices 206(1)-(N).

In one embodiment, one or more of modules 102 from FIG. 1 may, when executed by at least one processor of network device 202, enable network device 202 to apply system updates to network device 202. For example, and as will be described in greater detail below, determination module 104 may cause network device 202 to determine, by monitoring at least one of endpoint devices 206(1)-(N), time intervals 208 that indicate when a user of endpoint devices 206(1)-(N) is unlikely to access network 204 via network device 202. In addition, detection module 106 may cause network device 202 to detect that a system update 210 is available for network device 202. In response, identification module 108 may cause network device 202 to identify, based on time intervals 208, an optimal time 212 at which to apply system update 210 to network device 202. Finally, update module 110 may cause network device 202 to apply system update 210 to network device 202 at optimal time 212.

Network device 202 generally represents any type or form of network appliance or device capable of forwarding traffic (e.g., packets) between computing devices within a local network and/or an external network. In some examples, network device 202 may represent a modem and/or a router. The term "modem," as used herein, generally refers to any type or form of device that establishes a connection to the internet (e.g., to an internet service provider) and extends the internet connection to one or more additional devices. In some examples, a modem may connect multiple computing devices to the internet via a router (e.g., creating a local or internal network). The term "router," as used herein, generally refers to any type or form of device that forwards traffic between devices within a local network and/or to external networks via a modem.

Endpoint devices 206(1)-(N) generally represent any type or form of computing device capable of reading computer-executable instructions and/or connecting to a network via a network device. In some examples, all or a portion of endpoint devices 206(1)-(N) may be owned and/or accessed by a particular user or group of users. For example, endpoint devices 206(1)-(N) may include all or a portion of the internet-enabled devices within a house or office. Examples of endpoint devices 206(1)-(N) include, without limitation, laptops, tablets, desktops, servers, cellular phones, Personal Digital Assistants (PDAs), Internet of Things (IoT) devices (e.g., internet-enabled thermostats, kitchen appliances, security systems, baby monitors, etc.), multimedia players, embedded systems, wearable devices (e.g., smart watches, smart glasses, etc.), gaming consoles, combinations of one or more of the same, exemplary computing system 510 in FIG. 5, or any other suitable computing device.

Network 204 generally represents any medium or architecture capable of facilitating communication or data transfer. As noted, network 204 may facilitate communication between endpoint devices 206(1)-(N) and network device 202. In addition, network 204 may facilitate communication between two or more of endpoint devices 206(1)-(N). In some examples, network 204 may represent a Local Area Network (LAN), such as a home network. Additional examples of network 204 include, without limitation, an intranet, a Wide Area Network (WAN), a Personal Area Network (PAN), and/or any other suitable type of network. Network 204 may facilitate communication or data transfer using wireless or wired connections.

Figure 3:
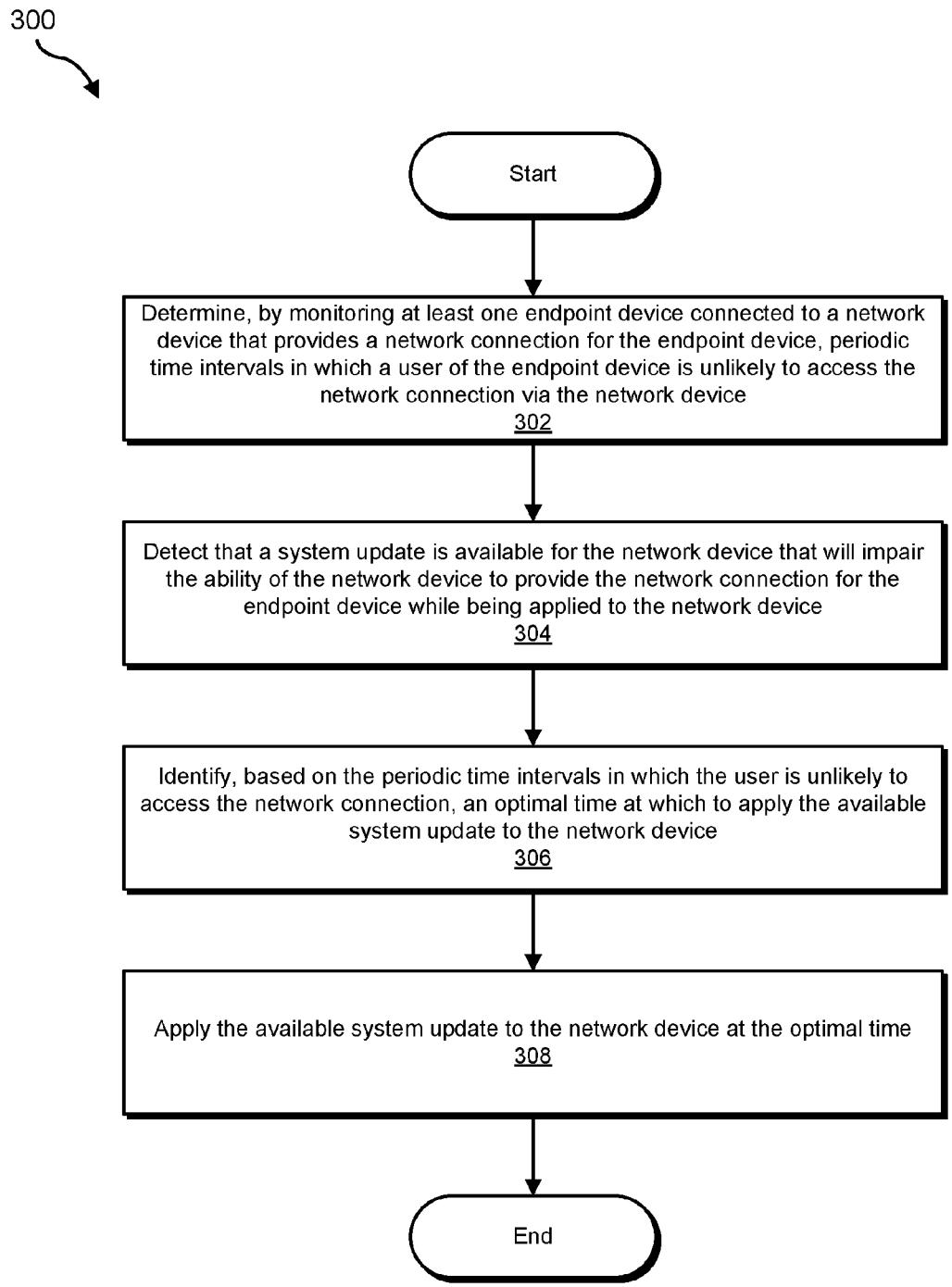
FIG. 3 is a flow diagram of an exemplary method for updating network devices.

FIG. 3 is a flow diagram of an exemplary computer-implemented method 300 for updating network devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may determine, by monitoring at least one endpoint device connected to a network device that provides a network connection for the endpoint device, periodic time intervals in which a user of the endpoint device is unlikely to access the network connection via the network device. For example, determination module 104 may, as part of network device 202 in FIG. 2, determine, by monitoring at least one of endpoint devices 206(1)-(N), time intervals 208 that indicate when a user of endpoint devices 206(1)-(N) is unlikely to access network 204 via network device 202.

The term "time interval," as used herein, generally refers to any specified duration of time. In some examples, a time interval may be described by a starting point (e.g., 2:00 PM) and an ending point (e.g., 5:00 PM). The term "periodic time interval," as used herein, generally refers to any time interval that is regularly repeated. For example, in addition to a starting point and an ending point, a periodic time interval may be described by a frequency with which it is repeated (e.g., every Thursday).

The systems described herein may determine periodic time intervals in which a user is unlikely to access a network connection in a variety of ways. In some examples, determination module 104 may determine periodic time intervals in which all of the users at a particular location are likely to be unable to and/or are not attempting to access a network connection at the location. For example, determination module 104 may determine when all of the users are likely to be outside of a range of the network connection. As an example, determination module 104 may determine periodic time intervals in which all of the employees of an office are not at the office. Additionally or alternatively, determination module 104 may determine periodic time intervals in which all users of a network connection are within a range of the network connection but are not attempting to access the network connection. For example, determination module 104 may determine periodic time intervals in which all individuals living in a house are asleep.

In some embodiments, determination module 104 may identify periodic time intervals in which a user is unlikely to access a network connection based on interactions between the user and one or more of the user's endpoint devices. For example, determination module 104 may detect each instance that a user accesses a network connection via their endpoint devices. Specifically, determination module 104 may identify and/or intercept all of the network traffic distributed between the endpoint devices and a network device that provides the network connection. Determination module 104 may record times at which the network traffic is distributed (e.g., the time of day, the day of the week, and/or the day of the month) and then identify periods of network inactivity based on the recorded times.

Additionally or alternatively, determination module 104 may determine when a user is unlikely to access a network connection based on services provided by one or more endpoint devices. For example, determination module 104 may determine that an endpoint device periodically provides a service for a user. Determination module 104 may then infer, based on the timing of the service provided by the endpoint device, when the user is unlikely to access a network connection utilized by the endpoint device. In some embodiments, determination module 104 may identify information indicative of when an endpoint device provides a periodic service for a user by accessing a user account or profile within the endpoint device that contains information entered by the user and/or collected by the endpoint device.

In an example of monitoring a service provided by an endpoint device, determination module 104 may determine that a user has installed a smart thermostat (e.g., a NEST AUTO-AWAY thermostat) within their house. Such a device may automatically adjust the temperature within a house based on whether individuals living in the house are at home or away. As such, the device may monitor, record, and/or predict periods of activity of the individuals within the house. Determination module 104 may access this information within the device and use the information to determine when the individuals within the house are likely to be away from the house.

In some examples, determination module 104 may gather historical data (i.e., training data) about habits or patterns of activity of a user for a period of time before determining periodic time intervals in which the user is unlikely to access a network connection. For example, determination module 104 may monitor one or more endpoint devices of the user for a predetermined amount of time (e.g., a week, a month, etc.) to gather information about the user's schedule (e.g., when the user is likely to be at home, at work, running errands, etc.). Determination module 104 may then analyze this data to identify time intervals in which the user did not access and/or was not available to access a network connection. Next, determination module 104 may use the identified time intervals to predict future time intervals in which the user is unlikely to access the network connection. For example, determination module 104 may extrapolate the identified time intervals to future instances. As an example, determination module 104 may determine that if a user did not access a network connection between 7:00 AM and 11:00 AM on three out of the previous four Fridays, the user is unlikely to access the network connection during the same time interval on following Fridays. Furthermore, determination module 104 may update or revise periodic time intervals in which a user is unlikely to access a network connection by continuing to monitor one or more of the user's endpoint devices.

Figure 4:
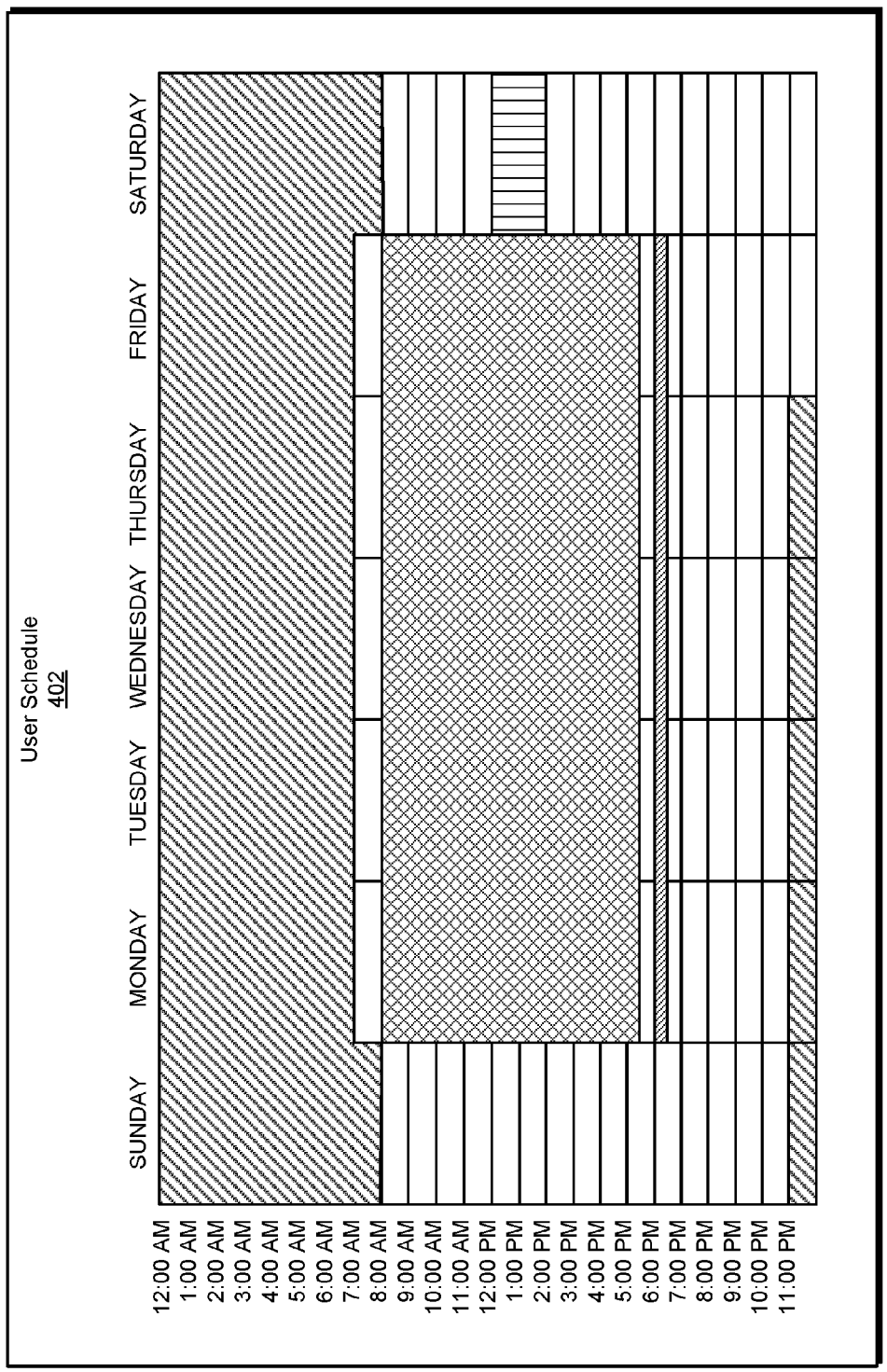
FIG. 4 is an illustration of exemplary periodic time intervals in which a user is unlikely to access a network connection.

FIG. 4 illustrates an example of periodic time intervals in which a user is unlikely to access a network connection in the user's home. In this example, shaded portions of a user schedule 402 may indicate time intervals during each week that correspond to periods when the user is likely away from the network connection, unable to access the network connection, and/or not attempting to access the network connection.

Specifically, as shown in FIG. 4, user schedule 402 may indicate that the user is unlikely to access the network connection between 12:00 AM and 8:00 AM on Saturdays and Sundays and between 11:00 PM and 7:00 AM each night starting on Sunday night and ending Friday morning. In this example, these time intervals may correspond to when the user is likely to be asleep. Determination module 104 may have identified these time intervals based on determining times at which network activity initiated by the user has stopped each night, times at which the user sets alarms within their mobile phone, times at which the user has programmed an internet-enabled coffee maker, and/or any additional indication of when the user may be going to sleep or waking up. In addition, user schedule 402 may indicate that the user is unlikely to access the network connection between 9:00 AM and 5:30 PM on Mondays-Fridays. In this example, these time intervals may correspond to when the user is likely to be at work or otherwise out of the house. In one example, determination module 104 may have identified these time intervals based on monitoring services such as a security system and/or smart thermostat within the user's house.

Furthermore, user schedule 402 may indicate that the user is unlikely to access the network connection between 6:00 PM and 6:30 PM on Mondays-Fridays. In this example, these time intervals may correspond to when the user is likely to be performing a task or chore such as walking their dog or cooking dinner. Finally, user schedule 402 may indicate that the user is unlikely to access the network connection between 12:00 PM and 2:00 PM on Saturdays, which may correspond to a weekly appointment or outing. In one example, determination module 104 may have identified these time intervals based on determining that the user initiates no or minimal network activity via an endpoint device during these times.

Returning to FIG. 3, at step 304 one or more of the systems described herein may detect that a system update is available for the network device that will impair the ability of the network device to provide the network connection for the endpoint device while being applied to the network device. For example, detection module 106 may, as part of network device 202 in FIG. 2, detect that system update 210 is available for network device 202.

The term "system update," as used herein, generally refers to any type or form of software-based upgrade or improvement to a computing device. In some examples, a developer or manufacturer of a device may periodically distribute system updates designed to enhance the security and/or performance of the device. A system update may generate such benefits by replacing all or a portion of the executable code (e.g., operating system, applications, firmware, etc.) running on the computing device.

The systems described herein may detect an available system update for a network device in a variety of ways. In some examples, detection module 106 may periodically (e.g., every day, every week, etc.) search for available updates. For example, detection module 106 may periodically query or crawl a website provided by a developer or manufacturer of a network device for an indication that a system update is available. Additionally or alternatively, detection module 106 may directly receive an indication that a system update is available for a network device. For example, a developer or manufacturer of the network device may distribute notifications to all or a portion of the network devices that have been purchased by customers to alert the customers that a system update is available.

In some examples, detection module 106 may determine a level of importance or urgency of an available system update. For example, detection module 106 may determine a degree to which an update will improve the performance or security of a network device. Detection module 106 may identify or deduce a level of importance of an available system update in a variety of ways. In one example, detection module 106 may classify an available system update as critical in the event that a network device will be non-functional and/or vulnerable to security threats without the update. Alternatively, detection module 106 may classify an available system update as non-critical in the event that the update only contains minor and/or non-essential upgrades (e.g., fixes to small software bugs).

Furthermore, in some embodiments, detection module 106 may determine that a creator or distributor of an update has directly tagged the update with an indication of its importance (e.g., by labelling the update as "essential" or "critical"). In another example, detection module 106 may determine a level of importance of an update based on contextual factors associated with the update, such as an amount of time that has passed since a network device has last received an update.

Returning to FIG. 3, at step 306 one or more of the systems described herein may identify, based on the periodic time intervals in which the user is unlikely to access the network connection, an optimal time at which to apply the available system update to the network device. For example, identification module 108 may, as part of network device 202 in FIG. 2, identify optimal time 212 based on time intervals 208.

The systems described herein may identify an optimal time at which to apply an available system update to a network device in a variety of ways. In some examples, identification module 108 may determine that the optimal time to apply an update is the time immediately following detection of the update (i.e., the current time). For example, identification module 108 may determine to immediately apply an update to a network device in the event that the update is identified during a periodic time interval in which a user is unlikely to access a network connection provided by the network device. Alternatively, identification module 108 may determine that an update should be immediately applied to a network device based on determining that the user is not currently accessing the network device and/or that applying the update will not result in a significant disruption to the user's network service. Furthermore, in some examples, identification module 108 may determine that an update should be immediately applied to a network device based on determining that a level of importance of the update indicates that the update is critical to the security and/or performance of the network device.

In other examples, identification module 108 may determine that the optimal time at which to apply a system update to a network device is a time in the future. For example, in the event that an update is not detected within a periodic time interval in which a user is unlikely to access a network connection, identification module 108 may determine to wait to apply the update until the beginning of the next-closest periodic time interval. Referring to the example of FIG. 4, detection module 106 may detect an available system update at 11:00 AM on a Saturday. In this example, identification module 108 may determine that the optimal time at which to apply the update is at 12:00 PM on that Saturday.

In one embodiment, identification module 108 may identify an optimal time at which to apply a system update based on whether the duration of the next-closest periodic time interval is sufficient for the update to be applied to a network device. In the event that an estimated amount of time to apply an update is longer that the duration of the next-closest time interval, identification module 108 may determine that the optimal time at which to apply the update is at the beginning of another time interval that is at least as long as the estimated application time. Referring to the above example involving FIG. 4, identification module 108 may determine that the available system update requires an estimated application time of more than two hours. As such, identification module 108 may determine that the optimal time at which to apply the update is at 12:00 AM (rather than 12:00 PM).

Returning to FIG. 3, at step 308 one or more of the systems described herein may apply the available system update to the network device at the optimal time. For example, update module 110 may, as part of network device 202, apply system update 210 to network device 202 at optimal time 212.

The systems described herein may apply a system update to a network device in a variety of ways. In some examples, update module 110 may download and/or receive a file or portion of code containing an update from a server or database managed by the organization providing the update. Update module 110 may then install or execute the file or portion of code on the network device. As explained above, in some embodiments, applying an update to a network device may disrupt or compromise the ability of the network device to provide a network connection. In such embodiments, the network device may resume providing the network connection after update module 110 completes the process of applying the update (e.g., by rebooting or restarting the network device).

In some examples, update module 110 may confirm that a user is not currently attempting to access a network connection provided by the network device before applying the update (i.e., update module 110 may ensure that the user is not unexpectedly accessing the network connection). However, in some embodiments, update module 110 may apply an available system update to a network device without direction from a user. For example, update module 110 may not seek permission from the user before applying the update to the network device, as update module 110 may apply the update at a time that identification module 108 determined is unlikely to inconvenience the user.

As explained above in connection with FIG. 3, a network device may monitor one or more endpoint devices connected to a network provided by the network device to determine time intervals in which a user of the endpoint devices is unlikely to access the network. For example, the network device may determine periodic time intervals in which the user is likely to be not able and/or is not attempting to access the network. When a system update is available for the network device, the network device may identify the next-closest time at which the user is unlikely to access the network. The network device may then apply the system update to the network device at this time so as not to interfere with attempts by the user to access the network.

Figure 5:
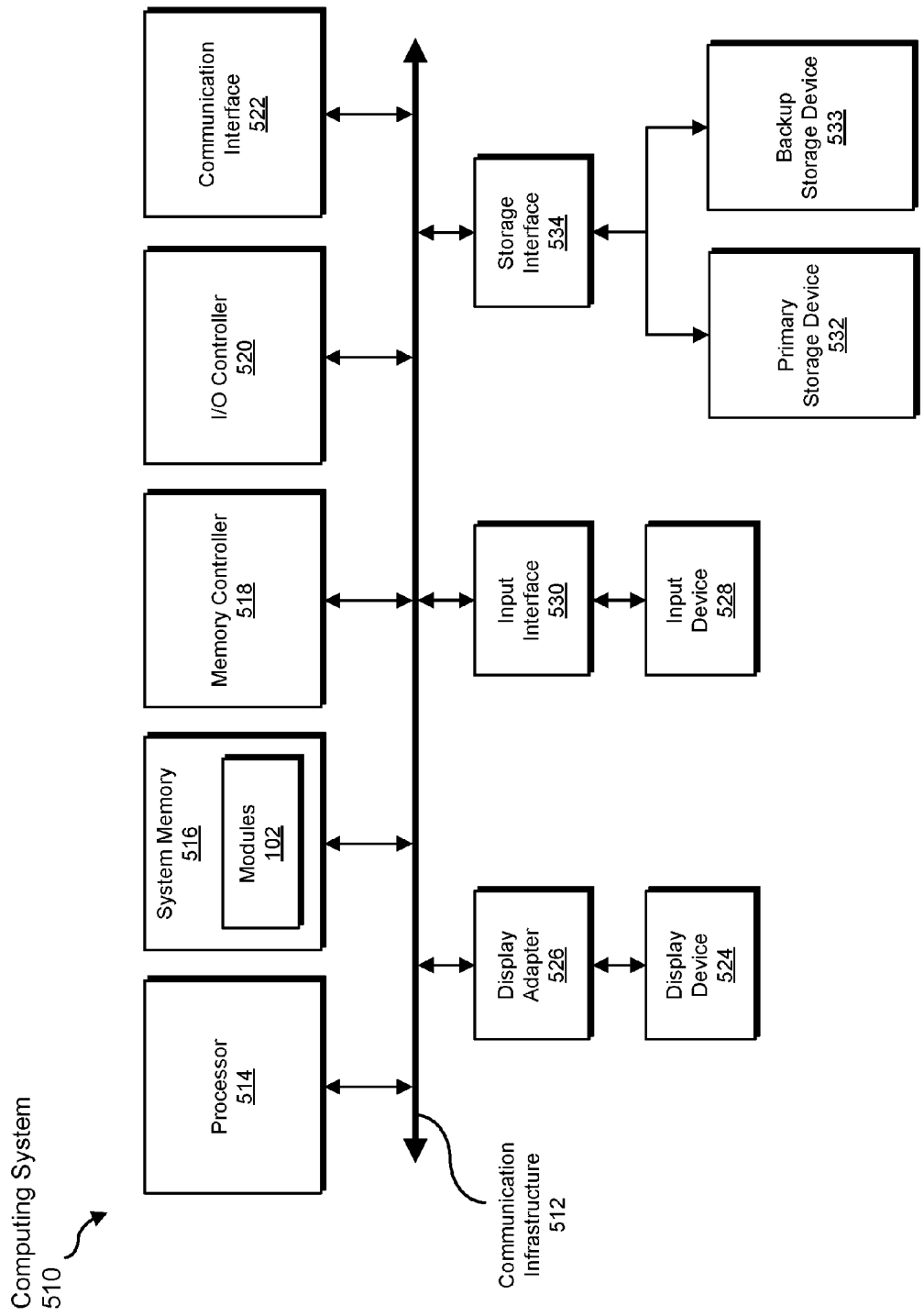
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
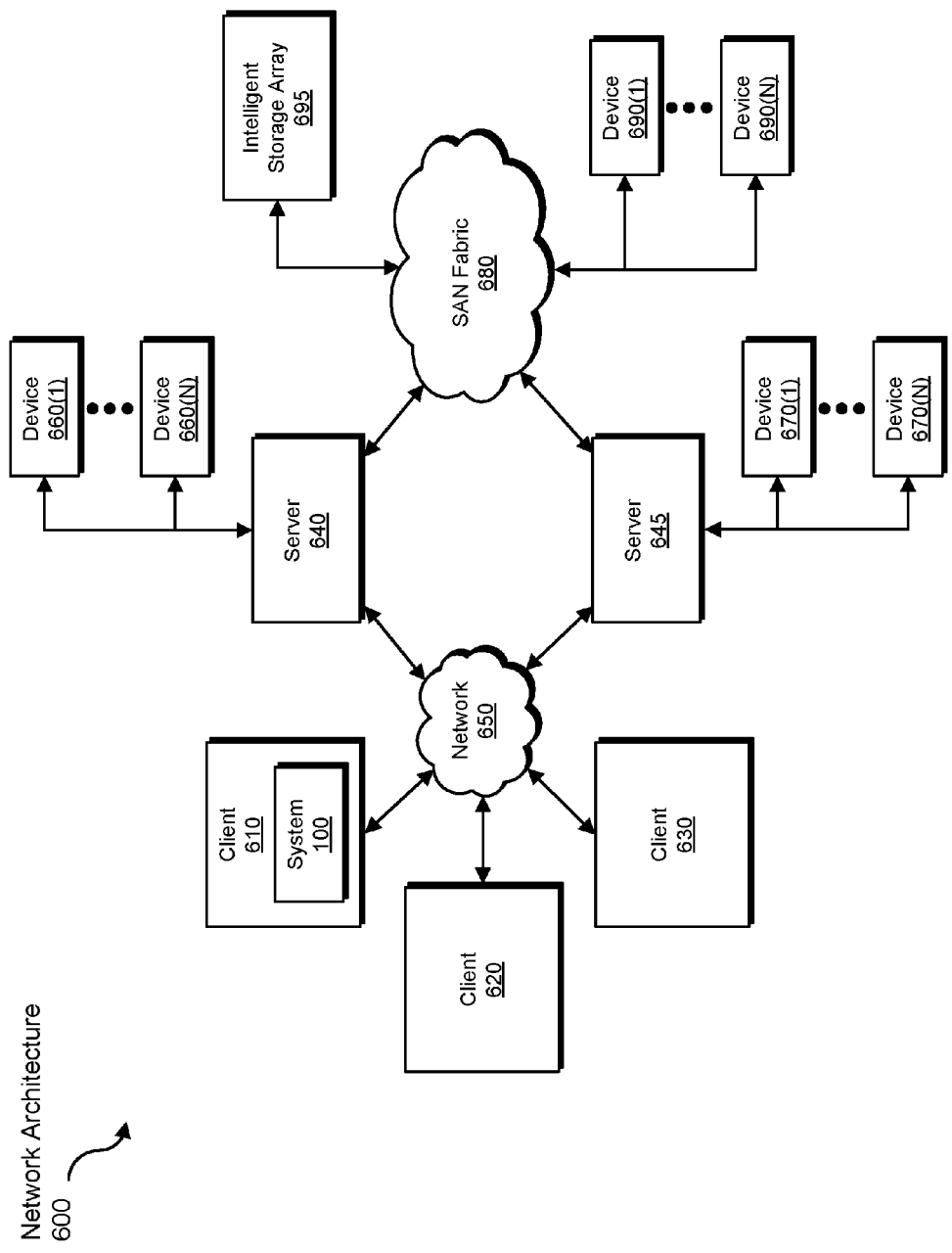
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for updating network devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive periodic time intervals in which a user is unlikely to access a network connection, transform the periodic time intervals into an optimal time at which to apply a system update to a network device that provides the network connection, output a result of the transformation to the network device, use the result of the transformation to update the network device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating network devices, at least a portion of the method being performed by a computing device comprising at least one processor, the method comprising:
    tracking network activity of an endpoint device that performs, via a network connection provided by a network device, a service for a user while the user is physically located within a certain distance of the network device;
    predicting periodic time intervals in which the user is expected to not access the network connection via the network device by:
        determining that the endpoint device is expected to provide the service to the user within a certain amount of time after the user wakes up;
        identifying, based at least in part on the network activity of the endpoint device, a time of day at which the endpoint device has historically provided the service to the user; and
        determining, based at least in part on the time of day at which the endpoint device has historically provided the service to the user, periodic time intervals in which the user is expected to be asleep;
    detecting that a system update is available for the network device that will impair the ability of the network device to provide the network connection for the endpoint device while being applied to the network device;
    identifying, based on the periodic time intervals in which the user is expected to not access the network connection, an optimal time at which to apply the available system update to the network device; and
    applying the available system update to the network device at the optimal time.

2. The method of claim 1, wherein tracking the network activity of the endpoint device comprises:
    intercepting network traffic distributed between the endpoint device and the network device; and
    recording times at which the network traffic was distributed.

3. The method of claim 1, wherein:
    the endpoint device provides the service for the user based at least in part on gathering information about periods of activity of the user; and
    tracking the network activity of the endpoint device comprises accessing the information gathered by the endpoint device.

4. The method of claim 1, wherein identifying the optimal time at which to apply the available system update comprises identifying a time at which the next-closest time interval in which the user is expected to not access the network connection begins.

5. The method of claim 4, wherein identifying the optimal time further comprises determining whether a duration of the next-closest time interval is sufficient for the available system update to be applied to the network device.

6. The method of claim 4, wherein identifying the optimal time further comprises determining to apply the available system update to the network device before the next-closest time interval begins based on determining at least one of:
    a level of importance of the available system update exceeds a predetermined importance threshold; and
    an amount of time until the next-closest time interval begins is greater than a predetermined amount of time.

7. The method of claim 1, further comprising confirming that the user is not currently accessing the network connection before applying the available system update to the network device at the optimal time.

8. The method of claim 1, wherein determining that the endpoint device is expected to provide the service to the user within the certain amount of time after the user wakes up comprises determining that the endpoint device provides an alarm intended to wake the user.

9. The method of claim 1, wherein determining that the endpoint device is expected to provide the service to the user within the certain amount of time after the user wakes up comprises at least one of:
    determining that the endpoint device is an Internet-enabled coffee maker that has historically been programmed to begin operating at a specific time; and
    determining that the endpoint device is an Internet-enabled thermostat that has historically been programmed to adjust an ambient temperature within a home of the user at the specific time.

10. A system for updating network devices, the system comprising:
    a determination module, stored in memory, that:
        tracks network activity of an endpoint device that performs, via a network connection provided by a network device, a service for a user while the user is physically located within a certain distance of the network device; and
        predicts periodic time intervals in which the user is expected to not access the network connection via the network device by:
            determining that the endpoint device is expected to provide the service to the user within a certain amount of time after the user wakes up;
            identifying, based at least in part on the network activity of the endpoint device, a time of day at which the endpoint device has historically provided the service to the user; and
            determining, based at least in part on the time of day at which the endpoint device has historically provided the service to the user, periodic time intervals in which the user is expected to be asleep;
    a detection module, stored in memory, that detects that a system update is available for the network device that will impair the ability of the network device to provide the network connection for the endpoint device while being applied to the network device;
    an identification module, stored in memory, that identifies, based on the periodic time intervals in which the user is expected to not access the network connection, an optimal time at which to apply the available system update to the network device;
    an update module, stored in memory, that applies the available system update to the network device at the optimal time; and at least one hardware processor configured to execute the determination module, the detection module, the identification module, and the update module.

11. The system of claim 10, wherein the determination module tracks the network activity of the endpoint device by:
intercepting network traffic distributed between the endpoint device and the network device; and
recording times at which the network traffic was distributed.

12. The system of claim 10, wherein:
the endpoint device provides the service for the user based at least in part on gathering information about periods of activity of the user; and
the determination module tracks the network activity of the endpoint device by accessing the information gathered by the endpoint device.

13. The system of claim 10, wherein the identification module identifies the optimal time at which to apply the available system update by identifying a time at which the next-closest time interval in which the user is expected to not access the network connection begins.

14. The system of claim 13, wherein the identification module further identifies the optimal time by determining whether a duration of the next-closest time interval is sufficient for the available system update to be applied to the network device.

15. The system of claim 13, wherein the identification module further identifies the optimal time by determining to apply the available system update to the network device before the next-closest time interval begins based on determining at least one of:
a level of importance of the available system update exceeds a predetermined importance threshold; and
an amount of time until the next-closest time interval begins is greater than a predetermined amount of time.

16. The system of claim 10, wherein the update module further confirms that the user is not currently accessing the network connection before applying the available system update to the network device at the optimal time.

17. A non-transitory computer-readable medium comprising one or more computer-readable instructions that, when executed by at least one processor of a computing device, cause the computing device to:
track network activity of an endpoint device that performs, via a network connection provided by a network device, a service for a user while the user is physically located within a certain distance of the network device;
predict periodic time intervals in which the user is expected to not access the network connection via the network device by:
determining that the endpoint device is expected to provide the service to the user within a certain amount of time after the user wakes up;
identifying, based at least in part on the network activity of the endpoint device, a time of day at which the endpoint device has historically provided the service to the user; and
determining, based at least in part on the time of day at which the endpoint device has historically provided the service to the user, periodic time intervals in which the user is expected to be asleep;
detect that a system update is available for the network device that will impair the ability of the network device to provide the network connection for the endpoint device while being applied to the network device;
identify, based on the periodic time intervals in which the user is expected to not access the network connection, an optimal time at which to apply the available system update to the network device; and
apply the available system update to the network device at the optimal time.

18. The computer-readable medium of claim 17, wherein the one or more computer-readable instructions cause the computing device to track the network activity of the endpoint device by:
intercepting network traffic distributed between the endpoint device and the network device; and
recording times at which the network traffic was distributed.

* * * * *